Patented Feb. 7, 1950

2,496,287

UNITED STATES PATENT OFFICE 2,496,287

PROCESS FOR SEPARATING CHEMICAL COMPOUNDS

Clifford A. Hampel, Harvey, Ill., and Winfred Luther Norem, Richmond, Calif., assignors to Cardox Corporation, Chicago, Ill., a corporation of Illinois Application February 19, 1947, Serial No. 729,462

7 Claims. (Cl. 23—167)

This invention relates to a process for the separation and recovery of the components present in a chemical reaction solution. The principal components to be separated are sulfuric acid, potassium perchlorate, and sodium acid sulfate.

In general the process involves first, the separation by filtration of the excess sulfuric acid from the salt solids; next the conversion by hydrolysis of the sodium acid sulfate to sodium sulfate to bring it all in solution; next the separation by filtration of the highly insoluble potassium perchlorate from the solution of sodium sulfate; and then the precipitation of the sodium sulfate in the form of its decahydrate so that it can be recovered by filtration.

The invention is illustrated in the accompanying drawings in which.

In the chemical reaction which terminates in the reaction solution containing the components to be separated, a mixture of one mole of potassium chlorate and two moles of sodium chlorate are reacted with an excess of concentrated sulfuric acid to form essentially two moles of chlorine dioxide gas, one mole of potassium perchlorate and two moles of sodium acid sulfate (sodium bisulfate or sodium hydrogen sulfate). The equation for this reaction is:

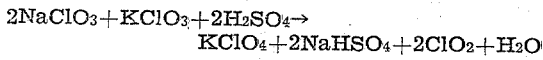

Figure 1:
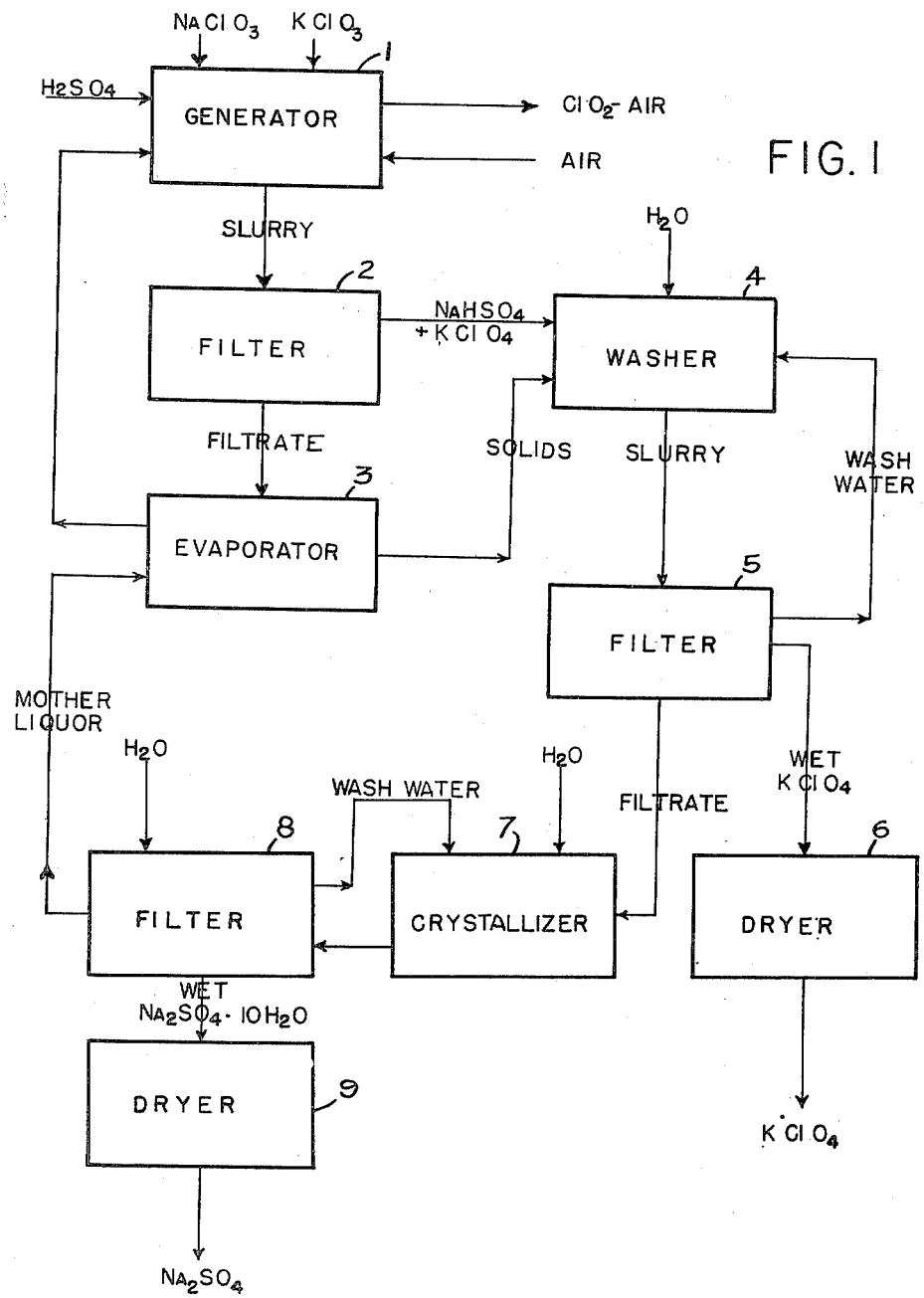
Figure 1 is a schematic flow diagram of the process of the invention.

After the completion of the above reaction in generator 1 of Figure 1 the contents of the generator are stripped by passage of air, of the chlorine dioxide. A slurry of the two salts potassium perchlorate and sodium acid sulfate, in the excess sulfuric acid, whose concentration is about 75%, is left. It is with the separation of the components of this mixture that this invention deals.

The slurry from generator 1 is first filtered in filter 2 to remove the excess $H_2SO_4$; a minor amount will be left with the solids as part of the mother liquor left on the filter cake. The filter cake is transferred to the washer 4 wherein it is treated with water in an amount which is preferably just sufficient to dissolve all of the sodium acid sulfate contained in the cake. This operation also dissolves a small amount of potassium perchlorate, but the major result is that the sodium acid sulfate is dissolved and changed to a solution containing equivalent parts of sodium sulfate and sulfuric acid. The reaction which occurs is:

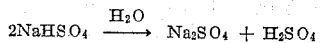

The slurry of solid potassium perchlorate in a solution of sodium sulfate and potassium perchlorate in a rather dilute sulfuric acid is passed to filter 5 where the solid potassium perchlorate is separated for drying. Wash water is used in filter 5 to free the solid potassium perchlorate of the adhering mother liquor. Since this wash water will also dissolve a small amount of the solid potassium perchlorate, it is desirable to put it back in the process. A convenient use for it is to return it to washer 4 to furnish all or a portion of the water required there. By doing this none of the salts in the wash water are wasted. The filter cake of wet potassium perchlorate from filter 5, freed of other compounds, can be dried in dryer 6 by any convenient method.

The filtrate from the filter 5 must now be treated so as to separate the two major compounds it contains, namely, sulfuric acid and sodium sulfate. In accordance with the invention this is done by cooling the solution in crystallizer 7 to cause sodium sulfate decahydrate or Glauber's salt, $Na_2SO_4.10H_2O$, to form and precipitate. The previous operations upon the slurry from generator 1 are conducted at room temperature, say 25° C., however, to precipitate the decahydrate the solution must be cooled to a lower temperature, i. e., to about 5° C. Seeding of the solution may be employed to cause formation of $Na_2SO_4.10H_2O$. However, before this is done, additional water is added to prevent formation of a sodium sulfate-sulfuric acid double compound of composition $NaHSO_4.Na_2SO_4$. This cooling and crystallization operation, when so conducted, does not cause the precipitation of any $KClO_4$ along with the $Na_2SO_4.10H_2O$.

The sodium sulfate decahydrate crystals are removed in the filter 8, and can be dried in dryer 9 to form anhydrous sodium sulfate, or merely dry Glauber's salt, as may be desired. It will be appreciated that the melting point of

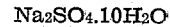

is 32.4° C. Washing with water is advisable in filter 8 to remove adhering mother liquor; this wash water can be used either to furnish the water used for the pre-crystallization dilution or to re-enter the cycle at washer 4 to furnish part of the water required there.

The mother liquor from the filter 8, comprises principally a dilute sulfuric acid containing sodium sulfate and a minor quantity of potassium perchlorate and has a sulfuric acid-sodium sulfate mole ratio much higher than the 1:1 ratio contained in the original sodium acid sulfate leaving the generator. It can be concentrated in evaporator 3 along with the original excess sulfuric acid from filter 2. Any solid sodium sulfate and potassium perchlorate precipitated during the evaporation (sulfuric acid concentration) step may re-enter the cycle as part of the feed to the washer 4. It might be mentioned that the concentration by water removal will cause any sodium sulfate which is precipitated to be in the form of sodium acid sulfate when the sulfuric acid content is over 30–35%.

Thus, the cycle has effected the separation and separate recovery of sulfuric acid, potassium perchlorate and sodium sulfate from a complex initial mixture of all three in water. Neither of the dry products, the potassium perchlorate and sodium sulfate, is contaminated by more than negligible amounts of the other components, and any small amount of residue potassium perchlorate and sodium sulfate remaining in the recovered sulfuric acid may be returned to the generator 1. Outside of mechanical losses during the handling involved in the process, the recoveries are essentially 100%.

By treating the solid feed to washer 4 with just sufficient water to dissolve all of the sodium acid sulfate at a temperature in the neighborhood of 25°, a minimum quantity of potassium perchlorate is dissolved simultaneously. If higher temperatures than, say room temperature, are used, the $Na_2SO_4/KClO_4$ ratio in the solution becomes lower; that is, the quantity of potassium perchlorate dissolved per unit of sodium sulfate becomes greater, an undesired result. After the sodium acid sulfate has been dissolved and the still solid potassium perchlorate removed, then the additional water needed to cause crystallization of $Na_2SO_4 \cdot 10H_2O$ can be added. This additional water cannot then dissolve $KClO_4$, since no solid $KClO_4$ is present.

It is for this reason that only as much water should be added to washer 4 as is required to bring all the sodium acid sulfate into solution. The water added into the crystallizer 7 to prevent the formation of the double salt $NaHSO_4 \cdot Na_2SO_4$ should not, for this reason be added to the washer 4. Enough water is added to the composition in crystallizer 7 so as to bring the composition, as regards sodium sulfate, sulfuric acid, and water, well down into the $Na_2SO_4 \cdot 10H_2O$ field. If the amount of water added were just enough to bring the composition barely within the $Na_2SO_4 \cdot 10H_2O$ field, for example 19.5% sulfuric acid, 29% sodium sulfate and 51.5% water, subsequent cooling would only result in a slight change of composition and a low yield of $Na_2SO_4 \cdot 10H_2O$. When more water is added a much greater yield of $Na_2SO_4 \cdot 10H_2O$ can be obtained and it is for this reason that the relatively larger amount of water is added in the crystallizer 7.

Since enough water is added to the saturated $Na_2SO_4$—$H_2SO_4$ solution in crystallizer 7 only $Na_2SO_4 \cdot 10H_2O$ is deposited upon subsequent cooling. The lower the final temperature reached, the greater the yield of $Na_2SO_4 \cdot 10H_2O$, but below about 5° a slight amount of potassium perchlorate also precipitates. It is for this reason that it is preferred that the solution not be cooled below about 5° C.

Figure 2:
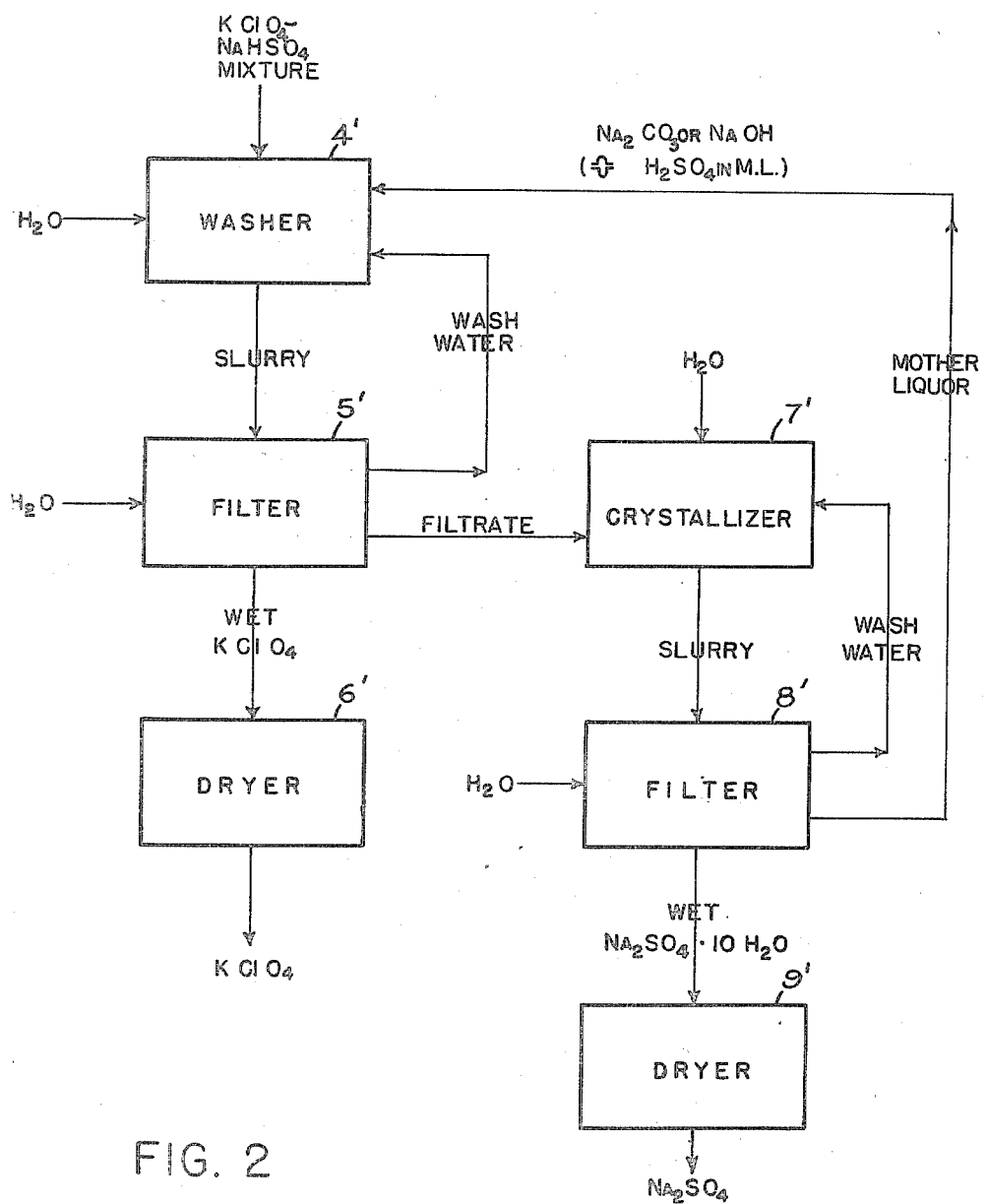
Fig. 2 is a schematic flow diagram of a modification of the process.

Another mode of operating the invention is illustrated in Figure 2. In this embodiment, the sulfuric acid in the mother liquor from the $Na_2SO_4 \cdot 10H_2O$ crystallization is neutralized with sodium carbonate or sodium hydroxide, and the resultant solution of sodium sulfate containing a minor amount of potassium perchlorate is fed back to the washer along with the fresh batch of sodium acid sulfate and potassium perchlorate. The operations are identical to the corresponding ones of Fig. 1, however, the mother liquor from the filter 8' is neutralized with sodium carbonate or sodium hydroxide to convert its sulfuric acid content to sodium sulfate. This neutralization may be effected at the washer 4', or in a separate vessel, the choice being dictated by optimum ease of handling the materials involved. While the material costs are increased over the cycle outlined in Fig. 1, in that the sulfuric acid consumption is doubled and sodium carbonate or sodium hydroxide is also required, the savings in evaporation and handling offer some advantages. The reaction involved is:

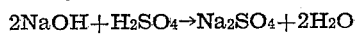
$$2NaOH + H_2SO_4 \rightarrow Na_2SO_4 + 2H_2O$$

or

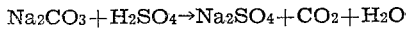
$$Na_2CO_3 + H_2SO_4 \rightarrow Na_2SO_4 + CO_2 + H_2O$$

Example 1

The following example will illustrate one mode of operating this invention according to the procedure of Figure 1.

A mixture of 104.2 parts of sodium acid sulfate, $NaHSO_4$, and 60.3 parts of potassium perchlorate, $KClO_4$, was treated in washer 4 with 96.2 parts of water at 25° to form a slurry. This slurry was filtered in filter 5 and 195.5 parts of a solution were recovered. The filter cake contained 55 parts of solid $KClO_4$ wet with 10.2 parts of mother liquor. Water washing followed by drying produced 53 parts of dry $KClO_4$. The wash water was used as part of the water for the treatment of the next batch of $NaHSO_4$ and $KClO_4$ in washer 4.

To the filtrate described above were added 77.5 parts of water, the resultant diluted solution having a composition of 21.5% $Na_2SO_4$, 14.8%, $H_2SO_4$, 62.0% $H_2O$ and 1.7% $KClO_4$. The diluted solution was then cooled to 5° in the crystallizer 7 to precipitate 49.4 parts of $Na_2SO_4 \cdot 10H_2O$, composed of 21.8 parts of $Na_2SO_4$ and 27.6 parts of $H_2O$, a yield of 37.4% of the $Na_2SO_4$ in the original liquor before cooling.

Mother liquor from the crystallizer 7 and filter 8 amounted to 217 parts and contained 36.5 parts of $Na_2SO_4$, 40.4 parts of $H_2SO_4$, 140.4 parts of $H_2O$ and 5.0 parts of $KClO_4$. It was concentrated by evaporation in evaporator 3 under a pressure of 250 mm. of Hg to a slurry composed of 61.3 parts of $NaHSO_4$ and 4.9 parts of $KClO_4$ as solids mixed with a solution of 15.4 parts $H_2SO_4$, 2.7 parts of $H_2O$, 0.2 part $Na_2SO_4$ and 0.1 part $KClO_4$. The precipitated $KClO_4$ and $NaHSO_4$ were made part of the next batch of these two compounds treated in the washer 4.

Example 2

The following example will illustrate the method of operating the invention according to the embodiment of Fig. 2.

A mixture of 104.2 parts of sodium acid sulfate, $NaHSO_4$ and 60.3 parts of potassium perchlorate, $KClO_4$, was treated with 96.2 parts of water in washer 4' at 25° to form a slurry. This slurry was filtered in filter 5' and 195.5 parts of a solution were recovered. The filter cake contained 55 parts of solid $KClO_4$ wet with 10.2 parts of mother liquor. Water washing followed by drying in dryer 6' produced 53 parts of dry $KClO_4$. The wash water was used as part of the water for the treatment of the next batch of $NaHSO_4$ and $KClO_4$.

To the filtrate described above were added 77.5 parts of water, the resultant diluted slurry having a composition of 21.5% $Na_2SO_4$, 14.8% $H_2SO_4$, 62.0% $H_2O$ and 1.7% $KClO_4$. The diluted solution was then cooled in crystallizer 7' to 5° C. to precipitate 49.4 parts of $Na_2SO_4 \cdot 10H_2O$, composed of 21.8 parts of $Na_2SO_4$ and 27.6 parts of $H_2O$, a yield of 37.4% of the $Na_2SO_4$ in the original liquor before cooling.

After separation of the precipitated

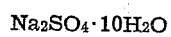
$Na_2SO_4 \cdot 10H_2O$ in filter 8', the mother liquor from the crystallizer amounted to 217 parts and contained 36.5 parts of $Na_2SO_4$, 40.4 parts of $H_2SO_4$, 140.4 parts of $H_2O$ and 5.0 parts of $KClO_4$. It was neutralized with 43.7 parts of sodium carbonate, $Na_2CO_3$, whereby an additional 58.5 parts of $Na_2SO_4$ were formed. This neutralized solution was fed back to washer 4' for treatment along with the next batch of $NaHSO_4$ and $KClO_4$.

Returning to Figure 1, it may be emphasized that the amounts of water used in washer 4 to treat the essentially 2/1 mole mixture of $NaHSO_4$—$KClO_4$ plus the recycled sodium acid sulfate and potassium perchlorate should be just enough so that at the temperature at which the undissolved potassium perchlorate is filtered off at 5 all of the $NaHSO_4$ will be in solution. If less is used, the solid $KClO_4$ will contain solid sodium sulfate. If more is used a larger quantity of potassium perchlorate will be dissolved.

The temperature at which the original $NaHSO_4$—$KClO_4$ solid mixture is treated in washer 4 and filter 5 has the following importance. Sodium sulfate decahydrate,

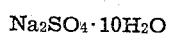
$Na_2SO_4 \cdot 10H_2O$ melts at 32.4° C. to form a slurry of solid anhydrous sodium sulfate in a solution of sodium sulfate. Contrary to the action of most compounds, the solubility of sodium sulfate at temperature above 32.4°, decreases with increasing temperature. Sodium acid sulfate, in contrast, has increased solubility as the temperature is raised. However, it has been found as a feature of this invention that solutions of sodium acid sulfate (or moles $Na_2SO_4/H_2SO_4=1$) and potassium perchlorate have a higher $Na_2SO_4/KClO_4$ ratio (on a weight basis) at 25° than at 60°. Per unit weight of sodium sulfate less potassium perchlorate is dissolved at 25° than at 60°. At 60° the ratio is about 12/1 while at 25° it is about 18.5/1. It is more advantageous, then, to operate the washer 4 at about 25° than at a higher temperature such as 60° in order to decrease the quantity of potassium perchlorate dissolved.

The initial composition in the crystallizer 7 just prior to cooling should contain from about 50 to 85% water so as to precipitate

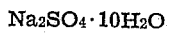
$Na_2SO_4 \cdot 10H_2O$ when the temperature is lowered. This will insure that enough additional water is added to the initial filtrate from filter 5 to insure the precipitation of $Na_2SO_4 \cdot 10H_2O$ only, when the diluted solution is cooled. The temperature must be at least high enough for any one composition in this range to keep all salts in solution.

The particular composition in crystallizer 7 after water is added thereto, and the temperature reached upon cooling will be chosen in most cases so as to obtain the greatest yield of sodium sulfate precipitated as $Na_2SO_4 \cdot 10H_2O$. However, some yield will be realized as long as the temperature to which the solution is cooled is less than the temperature at which the solution is saturated with respect to sodium sulfate. For example, if a solution which becomes saturated at about 12°, were cooled to 5°, a sizable yield would be obtained, but if it were cooled to 0° a larger yield would be realized, with a still greater yield at −10°. However, as has been stated, some potassium perchlorate is also precipitated at temperatures below about 5°.

Inasmuch as the mother liquor from the filter 8 at low temperature is concentrated in evaporator 3 and returned to the acidification step of generator 1, it should be necessary to mention only that a recycled portion of sodium acid sulfate and potassium perchlorate is added back to the washer 4 along with each new batch of sodium acid sulfate and potassium perchlorate. In the way of operating as shown in Fig. 2 with sodium carbonate or hydroxide to form sodium sulfate equivalent to the sulfuric acid present, and the resultant mixture of sodium sulfate and potassium perchlorate is fed to the washer 4' along with the next batch.

The process of this application can be used on any mixture of $Na_2SO_4$—$H_2SO_4$—$KClO_4$ containing any amount of $KClO_4$ and a mole ratio $H_2SO_4/Na_2SO_4$ up to about 4/1.

In considering the present separation process, it should be borne in mind that when two simple salts, such as $Na_2SO_4$ and $KCl$, which do not contain a common ion are dissolved in water, each salt dissociates into its component ions. When recombined, the metal ions may reunite with their original acid ions or with the acid ion from the other salt to form two new salts. Thus a solution containing two salts actually contains four potential salts. Such systems are called "reciprocal salt pairs."

At a certain temperature, all four solid salts may be in contact with a saturated solution forming a stable system. For the $KCl$—$Na_2SO_4$—$H_2O$ system this temperature is 4.4° C. Above or below that temperature, one of the solid phases (salts) disappears. However, in order for the system to be stable at any other given temperature, three of the solid phases must be present.

This theoretical consideration is true of the present system $KClO_4$—$Na_2SO_4$. The third solid phase in this case is probably $K_2SO_4$ but as a result of the present invention it has been discovered that the amount of that salt present is so low that it can be ignored for practical purposes. The theoretical presence of a third salt is recognized but it is present in such small quantities as to be negligible for practical purposes.

In carrying out the steps of this process, any suitable conventional apparatus may be employed and it is to be understood that the claims are not limited to the use of any specific types. For example, the filtration steps may be carried out by the use of filter papers or cloths, or by centrifuges.

Related subject matter is disclosed in my co-pending applications, Serial No. 647,403, filed February 13, 1946, now Patent No. 2,489,572, and Serial No. 659,042, filed April 2, 1946, now Patent No. 2,489,574, which relate to a process for the production of sulphuric acid slurries of potassium perchlorate and sodium acid sulphate, which may be resolved by the process of the instant application.

Having thus described the invention, we claim:

1. The process for separating and recovering solid potassium perchlorate and solid sodium sulfate from a sulphuric acid slurry which contains solid potassium perchlorate and solid sodium acid sulphate which comprises separating the solid sodium acid sulfate and solid potassium perchlorate from the sulfuric acid by filtration, adding to the solid sodium acid sulfate and solid potassium perchlorate an amount of water limited to that sufficient to bring all the sulfate into solution and convert it to sodium sulfate, separating the solid potassium perchlorate from the solution of sodium sulfate by filtration, cooling the sodium sulfate solution to cause precipitation of sodium sulfate decahydrate, and separating the precipitated decahydrate from the mother liquor.

2. The process for separating and recovering solid potassium perchlorate and solid sodium sulphate from a sulphuric acid slurry which contains solid potassium perchlorate and solid sodium acid sulfate which comprises separating the solid sodium acid sulfate and solid potassium perchlorate from the sulfuric acid by filtration, adding to the solid sodium acid sulfate and solid potassium perchlorate an amount of water limited to that sufficient to bring all the sulfate into solution and convert it to sodium sulfate, separating the solid potassium perchlorate from the solution of sodium sulfate by filtration, adding sufficient additional water so that on subsequent cooling substantially none of the double salt sodium sulfate-sodium acid sulfate will be precipitated, cooling the sodium sulfate solution to cause precipitation of sodium sulfate decahydrate, and separating the precipitated decahydrate from the mother liquor.

3. The process for separating and recovering solid potassium perchlorate and solid sodium sulphate from a sulphuric acid slurry which contains solid potassium perchlorate and solid sodium acid sulphate which comprises separating the solid sodium acid sulfate and solid potassium perchlorate from the sulfuric acid by filtration, adding to the solid sodium acid sulfate and solid potassium perchlorate sufficient water to bring all the sulfate into solution and convert it to sodium sulfate, separating the solid potassium perchlorate from the solution of sodium sulfate by filtration, cooling the sodium sulfate solution to about 5° C. to cause precipitation of sodium sulfate decahydrate, and separating the precipitated decahydrate from the mother liquor by filtration.

4. The process for separating and recovering solid potassium perchlorate and solid sodium sulphate from a sulphuric acid slurry which contains solid potassium perchlorate and solid sodium acid sulphate which comprises separating the solid sodium acid sulfate and solid potassium perchlorate from the sulfuric acid by filtration, adding to the solid sodium acid sulfate and solid potassium perchlorate an amount of water limited to that sufficient to bring all the sulfate into solution and convert it to sodium sulfate, separating the solid potassium perchlorate from the solution of sodium sulfate by filtration, adding sufficient additional water so that on subsequent cooling substantially none of the double salt sodium sulfate-sodium acid sulfate will be precipitated, cooling the sodium sulfate solution to about 5° C. to cause precipitation of sodium sulfate decahydrate, and separating the precipitated decahydrate from the mother liquor by filtration.

5. The process for separating and recovering solid potassium perchlorate and solid sodium sulphate from a sulphuric acid slurry which contains solid potassium perchlorate and solid sodium acid sulphate which comprises separating the solid sodium acid sulfate and solid potassium perchlorate from the sulfuric acid by filtration, adding to the solid sodium acid sulfate and solid potassium perchlorate sufficient water to bring all the sulfate into solution and convert it to sodium sulfate, separating the solid potassium perchlorate from the solution of sodium sulfate by filtration, cooling the sodium sulfate solution to cause precipitation of sodium sulfate decahydrate, separating the precipitated decahydrate from the mother liquor by filtration and concentrating the mother liquor for reuse.

6. The process for separating and recovering solid potassium perchlorate and solid sodium sulphate from a sulphuric acid slurry which contains solid potassium perchlorate and solid sodium acid sulphate which comprises separating the solid sodium acid sulfate and solid potassium perchlorate from the sulfuric acid by filtration, adding to the solid sodium acid sulfate and solid potassium perchlorate sufficient water to bring all the sulfate into solution and convert it to sodium sulfate, separating the solid potassium perchlorate from the solution of sodium sulfate by filtration, cooling the sodium sulfate solution to cause precipitation of sodium sulfate decahydrate, separating the precipitated decahydrate from the mother liquor by filtration and treating the mother liquor with an alkaline compound containing the sodium ion to thereby convert the sulfuric acid to sodium sulfate.

7. The process for separating and recovering solid potassium perchlorate and solid sodium sulphate from a sulphuric acid slurry which contains solid potassium perchlorate and solid sodium acid sulphate which comprises separating the solid sodium acid sulfate and solid potassium perchlorate from the sulfuric acid by filtration, adding to the solid sodium acid sulfate and solid potassium perchlorate at a temperature of about 25° C. sufficient water to bring all the sulfate into solution and convert it to sodium sulfate, separating the solid potassium perchlorate from the solution of sodium sulfate by filtration, cooling the sodium sulfate solution to about 6° C. to cause precipitation of sodium sulfate decahydrate, separating the precipitated decahydrate from the mother liquor by filtration and concentrating the mother liquor for reuse.

CLIFFORD A. HAMPEL.
WINFRED LUTHER NOREM.

REFERENCES CITED

The following references are of record in the file of this patent:

UNITED STATES PATENTS

| Number | Name | Date |
| --- | --- | --- |
| 1,812,310 | Stockly | June 30, 1931 |
| 2,275,825 | Lewis | Mar. 10, 1942 |
| 2,373,830 | Holst | Apr. 17, 1945 |

OTHER REFERENCES

Parkes, Mellor's Inorganic Chemistry, 1939 ed., pp. 567–8.

Ephraim, Inorganic Chemistry, 4th edition p. 581.